United States Patent [19]

Lynum et al.

[11] Patent Number: 5,725,616
[45] Date of Patent: Mar. 10, 1998

[54] METHOD FOR COMBUSTION OF HYDROCARBONS

[75] Inventors: Steinar Lynum; Kjell Haugsten, both of Oslo; Ketil Hox; Jan Hugdahl, both of Trondheim; Nils Myklebust, Trondheim, all of Norway

[73] Assignee: Kvaerner Engineering A.S., Lysaker, Norway

[21] Appl. No.: 582,592

[22] PCT Filed: Dec. 11, 1992

[86] PCT No.: PCT/NO92/00200

§ 371 Date: Sep. 22, 1994

§ 102(e) Date: Sep. 22, 1994

[87] PCT Pub. No.: WO94/12205

PCT Pub. Date: Jun. 24, 1993

Related U.S. Application Data

[63] Continuation-in-part of Ser. No. 244,298, Sep. 22, 1994, abandoned.

[30] Foreign Application Priority Data

Dec. 12, 1991 [NO] Norway .................................. 914909

[51] Int. Cl.$^6$ ........................................................ C01B 3/32
[52] U.S. Cl. .................... 48/127.3; 48/127.1; 48/127.5; 48/199 M; 423/458
[58] Field of Search ..................... 48/127.1, 127.3, 48/127.5, 198.1, 199 FM; 123/DIG. 12; 423/458

[56] References Cited

U.S. PATENT DOCUMENTS

| | | | |
|---|---|---|---|
| 1,404,235 | 1/1922 | Rose et al. | 48/199 FM |
| 1,592,974 | 7/1926 | Szarvas | 48/DIG. 5 |
| 1,767,357 | 6/1930 | Garner | 48/127.1 |
| 1,983,992 | 12/1934 | Pyzel | 48/127.1 |
| 2,171,596 | 9/1939 | Parker | 48/127.1 |
| 2,488,969 | 11/1949 | Dietler | 48/76 |
| 2,564,736 | 8/1951 | Stokes | 423/458 |
| 3,172,729 | 3/1965 | Galocsy et al. | 423/458 |
| 3,298,949 | 1/1967 | Nelson | 48/127.5 |
| 5,011,670 | 4/1991 | Davis et al. | 423/458 |
| 5,139,002 | 8/1992 | Lynch et al. | 123/DIG. 12 |

FOREIGN PATENT DOCUMENTS

| | | |
|---|---|---|
| 2413558 | 10/1974 | Germany . |
| 211457 | 11/1984 | Germany . |
| 276098 | 2/1990 | Germany . |
| 350413 | 12/1929 | United Kingdom ................. 48/127.5 |

*Primary Examiner*—Timothy McMahon
*Attorney, Agent, or Firm*—Cushman Darby & Cushman Intellectual Property Group of Pillsbury Madison & Sutro LLP

[57] ABSTRACT

In order to enrich natural gas or other hydrocarbon gases with hydrogen, thus reducing the carbon content and thereby achieving a reduction or elimination of the discharge of carbon dioxide during combustion of the gases, a pyrolytic process is conducted in the feed stream for the natural gases or hydrocarbon gases which are to be burned. The gas is passed through a reactor in which it is decomposed at least partially into a carbon constituent and a hydrogen constituent. The carbon constituent is removed to a desired level. Any remaining constituent together with the hydrogen constituent is conveyed to the combustion process while the removed carbon constituent is conveyed out of the process for separate application. The pyrolytic process can be carried out on the entire stream or only a partial stream.

3 Claims, No Drawings

5,725,616

METHOD FOR COMBUSTION OF HYDROCARBONS

This is a continuation-in-part of application Ser. No. 08/244,298, filed on Sep. 22, 1994, which is now abandoned.

FIELD OF THE INVENTION

The invention concerns a method for reducing the carbon content in a feed flow of natural gas or other hydrocarbon gases for a combustion process or a chemical process in order thereby to eliminate to the desired degree or at least to reduce the discharge of carbon dioxides in the combustion of the gas, e.g. in connection with a gas-fired power station.

BACKGROUND OF THE INVENTION

During the combustion of fossil fuels, coal, natural gas and other hydrocarbons, both water in the form of vapour and carbon dioxide will be found in the waste gases. The proportional incidence between these two gases will be dependent on the quantitive ratio of carbon to hydrogen in the fuel concerned. Coal will produce almost only carbon dioxide, methane will produce water and carbon dioxide in the ratio of 2:1, while hydrogen will only produce water. In the efforts to reduce the greenhouse effect, the discharges of carbon dioxide are becoming ever less acceptable. Thus it is vitally important to limit these discharges, the best best solution being to eliminate them entirely.

SUMMARY OF THE INVENTION

The object of the present invention is to improve this situation by providing a method for reducing the carbon content of natural gas and hydrocarbon gas. This reduction should be capable of being implemented in such a manner that a desired degree of reduction of the $CO_2$ content can be achieved after a combustion or a chemical process. The reduction can extend all the way through to the use of pure hydrogen as a fuel, thus completely avoiding the discharges of $CO_2$.

Thus a further object of the invention is also to make it possible for natural gas to be used as a fuel with a greatly reduced production of carbon dioxide, e.g. in a gas turbine.

These objects are achieved by a method which according to the invention is characterized by the features in the claims presented.

The invention is based on the fact that it is possible to decompose hydrocarbons pyrolitically into carbon and hydrogen. By using pure hydrogen as a fuel the discharge of carbon dioxide will be eliminated. If carbon is removed from the natural gas or the hydrocarbon gas which is used as a fuel, the discharge of carbon dioxide will be reduced before the combustion.

A reduction of this kind can be carried out by performing a complete or partial conversion of natural gas or hydrocarbon gases in a feed stream to a combustion process or a chemical process. The feed stream is decomposed to the desired degree into carbon and hydrogen, whereof the natural gas with the reduced carbon content goes to combustion or a chemical process and the carbon constituent is removed from the process for separate application. Such a reduction can also be performed by converting a partial stream of the natural gas or the hydrocarbon gas.

In both cases the decomposition into carbon and hydrogen will require energy. The energy content in the gases with reduced carbon content is lower than in pure natural gas or hydrocarbon gas since the liberated carbon represents the lost energy. The result will be that more gas in total has to be supplied to the process in order to achieve the same net effect as from pure natural gas or hydrocarbon gas. The extent of this additional amount will be dependent on the degree to which the carbon content has to be reduced, i.e. the extent to which a conversion has to be performed, and also on the efficiency of the combustion process concerned.

The object is to be able to use pure hydrogen as a combustion gas in order thereby to be able to completely eliminate the $CO_2$ discharges.

At existing plants, however, there will be operating conditions which prevent the use of pure hydrogen, thus making it necessary to add a certain amount of hydrocarbons.

The process is therefore designed so as to offer the possibility of adding a certain amount of natural gas or hydrocarbon gas to the hydrogen stream and the amount can be adjusted according to the operating conditions.

After a combustion process, the waste gases are purified by methods known in the art and the purification methods are often extremely expensive, as for example in the case of catalytic purification.

It has now been discovered that the expenses involved in the conversion of natural gas or hydrocarbon gas which are used as a fuel for a combustion plant, i.e. before combustion, can be compensated for, thus enabling an economically justifiable process to be achieved despite the energy loss in the combustion stream. This is achieved by producing pure carbon in addition to hydrogen in the pyrolytic process in the method according to the invention. The carbonaceous material will be present in the form of carbon black and as such a material will have a very high value. Carbon black can, e.g., be used as a reduction agent in the metallurgical industry or on the conventional "carbon black market". If the carbonaceous material is used for anodes in the aluminium industry, this will entail substantial improvements both from the environmental and the economic point of view, since the new anodes will not pollute either the electrolyte and thus the product or the environment by the discharge of sulphur and tar.

Thus by means of the invention a highly favourable combination has been obtained of financially profitable industrial production and conservation of the environment, i.e. a reduction in pollution.

DETAILED DESCRIPTION OF THE INVENTION

In the following section the invention will be described in more detail by means of an example of the use of the method.

As an example, the operation of a gas-fired power station based on natural gas as its energy source has been chosen. The example is intended to illustrate the main principles of the invention. Other applications of the invention could be the production of pure hydrogen and the use of the method in all processes where natural gas or another hydrocarbon are used as the energy source. The invention is particularly well suited in connection with power production with fuel cells based on hydrogen as the means of combustion.

In the supply line to a gas-fired power station, which, e.g., is operated by the use of natural gas, e.g. methane, there is provided a reactor which is operated according to the pyrolytic principle with a plasma torch and which causes a decomposition of the incoming natural gas or hydrocarbon gas into a constituent of hydrogen and a constituent of carbon particles. The reactor may be located in a branch line or a line bypassing the reactor. The method of operation of such a reactor and the design of a plasma torch for this are described in the applicant's related U.S. patent application, Ser. No. 08/244,295 filed May 26, 1994 now U.S. Pat. No. 5,486,674 granted Jan. 23, 1996 the disclosure of which is incorporated herein by reference. As described in these documents, a quality control can be performed for the carbon constituent. The hydrogen formed is also used via a return line as a plasma-forming gas for the torch, thus enabling this entire reactor to be operated without causing any pollution.

The hydrogen gas from the reactor is then passed to the gas turbine where it is used either alone or together with hydrocarbons (methane) as fuel in the gas turbine. The gas turbine is operated in a conventional manner. However, there is one major difference, which is that the discharge of carbon dioxide is reduced or completely eliminated. The degree to which the discharges of carbon dioxide are reduced will be dependent on how large a proportion of the supply to the gas turbine is composed of pure hydrogen. Throughout the process, the proportion can be regulated in the entire area from no admixture of hydrogen to pure hydrogen.

What is claimed is:

1. A method of reducing the discharge of carbon dioxide from a process using the combustion of natural gas or hydrocarbon gas to generate energy, the steps comprising, prior to the process for combustion, feeding substantially all of the said gas to a decomposition reactor including a plasma torch to subject said gas to a pyrolytic process of the type that yields hydrogen and undecomposed gas and then removing the carbon from the hydrogen and the undecomposed gas so that the gas stream exiting the decomposition reactor is substantially hydrogen and undecomposed gas.

2. The method as claimed in claim 1 including the step of recycling hydrogen produced in the decomposition reactor to the decomposition reactor plasma torch.

3. A method of reducing the discharge of carbon dioxide from a process using the combustion of one of natural gas and hydrocarbon gas to generate energy, the steps comprising, prior to the process for combustion, feeding the entire amount of the gas to the inlet of a decomposition reactor and through the said reactor to the outlet of the reactor, said decomposition reactor including a plasma torch and including the step of subjecting said gas to a pyrolytic process with said plasma torch to yield hydrogen, carbon and undecomposed gas and then removing said carbon from the hydrogen and undecomposed gas so that the gas stream exiting the outlet of aid decomposition reactor is substantially hydrogen fuel and feeding the hydrogen fuel and undecomposed gas to a combustion process.

* * * * *